United States Patent
Venema et al.

(10) Patent No.: US 6,437,770 B1
(45) Date of Patent: Aug. 20, 2002

(54) FLAT-COIL ACTUATOR HAVING COIL EMBEDDED IN LINKAGE

(75) Inventors: Steven Venema; Blake Hannaford, both of Seattle, WA (US)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 09/237,138

(22) Filed: Jan. 25, 1999

Related U.S. Application Data
(60) Provisional application No. 60/072,525, filed on Jan. 26, 1998.

(51) Int. Cl.$^7$ .................................................. G09G 5/00
(52) U.S. Cl. ........................................ 345/156; 345/157
(58) Field of Search ................................ 345/156, 157, 345/161, 162, 163, 164, 165, 166, 167, 168, 173, 179; 33/1 M; 74/471 XY

(56) References Cited

U.S. PATENT DOCUMENTS

| | | | |
|---|---|---|---|
| 3,919,691 A | 11/1975 | Noll ......................... | 340/172.5 |
| 4,985,652 A | 1/1991 | Oudet et al. .................. | 310/15 |
| 5,006,703 A | 4/1991 | Shikunami et al. .... | 250/231.13 |
| 5,065,145 A | 11/1991 | Purcell ........................ | 340/706 |
| 5,146,566 A | 9/1992 | Hollis, Jr. et al. .......... | 395/275 |
| 5,193,963 A | 3/1993 | McAffee et al. ............... | 414/5 |
| 5,223,776 A | 6/1993 | Radke et al. ................ | 318/568 |
| 5,297,057 A | 3/1994 | Kramer et al. .............. | 364/512 |
| 5,491,477 A | 2/1996 | Clark et al. .................... | 341/20 |
| 5,513,100 A | 4/1996 | Parker et al. ................. | 341/20 |
| 5,587,937 A | 12/1996 | Massie et al. ............... | 364/578 |
| 5,589,854 A | 12/1996 | Tsai ............................. | 345/161 |
| 5,623,582 A | 4/1997 | Rosenberg ................... | 395/99 |
| 5,642,469 A * | 6/1997 | Hannaford et al. .......... | 345/179 |
| 5,643,087 A | 7/1997 | Marcus et al. ................ | 463/38 |

(List continued on next page.)

FOREIGN PATENT DOCUMENTS

| | | |
|---|---|---|
| GB | 2347199 A | 8/2000 |

OTHER PUBLICATIONS

Batter, et al., "Grope–1: A Computer Display to the Sense of Feel", University of North Carolina at Chapel Hill, Chapel Hill, North Carolina, USA.

Minsky, et al., "Feeling and Seeing: Issues in Force Display", Department of Computer Science, University of North Carolina at Chapel Hill, Chapel Hill, NC 27599, 1990, ACM.

Iwata, H., "Pen–based Haptic Virtual Environment," IEEE, 0–7803–1363–1, 1993, pp. 287–292.

Tavkhelidze, D.S., "Kinematic Analysis of Five–Link Spherical Mechanisms," Mechanism and Machine Theory, Pergamon Press, 1974, pp. 181–190.

Buttolo, P. et al. "Hard Disk Actuators for Mini Teleoperation," Proc. SPIE, Telemanipulator and Telepresence Technologies Symp., 1994, pp. 55–61.

(List continued on next page.)

*Primary Examiner*—Xiao Wu
(74) *Attorney, Agent, or Firm*—Townsend, Townsend & Crew

(57) ABSTRACT

A flat-coil actuator embedded in a linkage of a mechanical interface for a force feedback device. The linkage rotates about an axis, where a flat coil is embedded in the linkage between two ends or connection points of the linkage. Magnets are positioned parallel to the flat coil, where a force is produced on the linkage when a current is flowed in the coil. An embedded position sensor, such as an optical encoder, can be coupled to the linkage. A force feedback device incorporating the flat-coil actuator includes a user manipulandum, where the linkage is coupled between a ground and the user manipulandum. Other linkages can also be coupled to the actuator to provide mechanisms such as a five-bar linkage mechanism.

20 Claims, 5 Drawing Sheets

U.S. PATENT DOCUMENTS

| | | | |
|---|---|---|---|
| 5,666,138 A | 9/1997 | Culver | 345/161 |
| 5,709,219 A | 1/1998 | Chen et al. | 128/782 |
| 5,714,978 A | 2/1998 | Yamanaka et al. | 345/157 |
| 5,721,566 A | 2/1998 | Rosenberg et al. | 345/161 |
| 5,731,804 A | 3/1998 | Rosenberg | 345/156 |
| 5,734,373 A | 3/1998 | Rosenberg et al. | 345/161 |
| 5,742,278 A | 4/1998 | Chen | 345/156 |
| 5,767,839 A | 6/1998 | Rosenberg | 345/161 |
| 5,781,172 A | 7/1998 | Engel et al. | 345/164 |
| 5,790,108 A | 8/1998 | Salcudean et al. | 345/184 |
| 5,805,140 A | 9/1998 | Rosenberg et al. | 345/161 |
| 5,816,105 A | 10/1998 | Adelstein | 74/471 |
| 5,825,308 A | 10/1998 | Rosenberg | 341/582 |
| 5,828,197 A | 10/1998 | Martin et al. | 318/567 |
| 5,831,408 A | 11/1998 | Jacobus et al. | 318/568.11 |
| 5,844,673 A | 12/1998 | Ivers | 356/138 |
| 5,847,528 A | 12/1998 | Hui et al. | 318/568.1 |
| 5,889,672 A | 3/1999 | Schuler et al. | 364/188 |
| 5,990,869 A | 11/1999 | Kubica et al. | 345/163 |
| 6,001,014 A | 12/1999 | Ogata et al. | 463/37 |
| 6,004,134 A | 12/1999 | Marcus et al. | 434/45 |
| 6,100,874 A | 8/2000 | Schena et al. | 345/157 |
| 6,104,382 A | 8/2000 | Martin et al. | 345/161 |
| 6,166,723 A | 12/2000 | Schena et al. | 345/184 |
| 6,201,533 B1 | 3/2001 | Rosenberg et al. | 345/156 |
| 6,256,011 B1 | 7/2001 | Culver | 345/157 |

OTHER PUBLICATIONS

Rosenberg, L. et al., "Commercially Viable Force Feedback Controller for Individuals with Neuromotor Disabilities," USAF Armstrong Laboratory AL/CF–TR–1997–0016, 1996, pp. 1–33.

Ramstein, C. "Combining Haptic and Braille Technologies: Design Issues and Pilot Study," ASSETS '96, ACM 0–89791–776–6/96/04, 1996, pp. 37–44.

Hannaford, B. et al., "Performance Evaluation of a Six–Axis Generalized Force–Reflecting Teleoperator," IEEE Transactions on Systems, Man, and Cybernetics, 1991.

Adelstein, B., "Design and Implementation of a Force Reflecting Manipulandum for Manual Control Research," Dept. of Mech. Engineering, MIT, 1992, pp. 1–24.

Buttolo, P. et al., "Pen–Based Force Display for Precision Manipulation in Virtual Environments," IEEE, 0–8186–7084–3/95, 1995, pp. 217–224.

Iwata, H., "Artificial Reality with Force–feedback: Development of Desktop Virtual Space with Compact Master Manipulator," Computer Graphics, vol. 24, No. 4, 1990, pp. 165–170.

Millman, P. et al., "Design of a Four Degree–of–Freedom Force–Reflecting Manipulandum with a Specified Force/Torque Workspace," IEEE CH2969–4, 1991, pp. 1488–1492.

Payette, J. et al., "Evaluation of a Force Feedback (Haptic) Computer Pointing Device in Zero Gravity", Proceedings of the ASME Dynamics Systems and Control Division, ASME Oct. 17, 1996, pp. 547–553.

Brooks, F. et al., "Project GROPE—Haptic Displays for Scientific Visualization," Computer Graphics, vol. 24, No. 4, 1990, pp. 177–185.

Howe, R. et al., "Task Performance with a Dextrous Teleoperated Hand System," Proceedings of SPIE, vol. 1833, Nov. 1992.

Ellis, R.E. et al., "Design and Evaluation of a High–Performance Prototype Planar Haptic Interface," ASME Dec. 3, 1993, DSC–vol. 49, pp. 55–64.

Bostrom, M. et al., "Design of an Interactive Lumbar Puncture Simulator with Tactile Feedback," IEEE 0–7803–1363–1/93, 1993, pp. 280–286.

Schmult, Brian et al., "Application Areas for a Force–Feedback Joystick," ASME 1993, DSC–vol. 49, pp. 47–54.

Ramstein, C. et al., "The Pantograph: A Large Workspace Haptic Device for a Multimodal Human–Computer Interaction," Computer–Human Interaction, CHI '94, 1994, pp. 1–3.

Hayward, V. et al., "Design and Multi–Objective Optimization of a Linkage for a Haptic Interface," Advances in Robot Kinematics and Computationed Geometry, 1994, pp. 359–368.

Kelley, A.J. et al., "MagicMouse:Tactile and Kinesthetic Feedback in the Human–Computer Interface using an Electromagnetically Actuated Input/Output Device," Dept. of Elec. Engineering, Univ. of British Columbia, 1993, pp. 1–27.

Hannaford, B. et al., "Scaling of Direct Drive Robot Arms," Int'l Journal of Robotics Research, 1996, pp. 1–47.

Hirota, Koichi et al., "Development of Surface Display," IEEE 0–7803–1363–1, 1993, pp. 256–262.

* cited by examiner

FLAT-COIL ACTUATOR HAVING COIL EMBEDDED IN LINKAGE

CROSS REFERENCE TO RELATED APPLICATIONS

This application claims the benefit of provisional application Ser. No. 60/072,525, filed Jan. 26, 1998 by Steven Venema and Blake Hannaford, entitled "Flat-Coil Actuator Having Actuator Coil and Position Encoder Embedded in Linkage," which is incorporated herein by reference.

BACKGROUND OF THE INVENTION

This invention relates generally to force output devices, and more particularly to flat-coil actuators for use in force feedback interface devices.

Actuators are used in a variety of devices to output a desired magnitude and direction of force. Haptic ("force feedback") interface devices are used to interface a human with a host computer and use actuators to output feel sensations to the user to enhance or embellish the user's interaction with an application program running on the host computer. Examples of mass-market force feedback interface devices include joysticks and mice. A force feedback joystick allows the user to input direction information to a computer by moving the joystick handle in provided degrees of freedom, and uses actuators to output forces in those degrees of freedom to enhance events and interactions occurring in an application program such as a computer game. A force feedback mouse can similarly output forces in the degrees of motion of the mouse to assist the user in moving a cursor to icons or windows in a graphical user interface, for example.

Figure 1A:
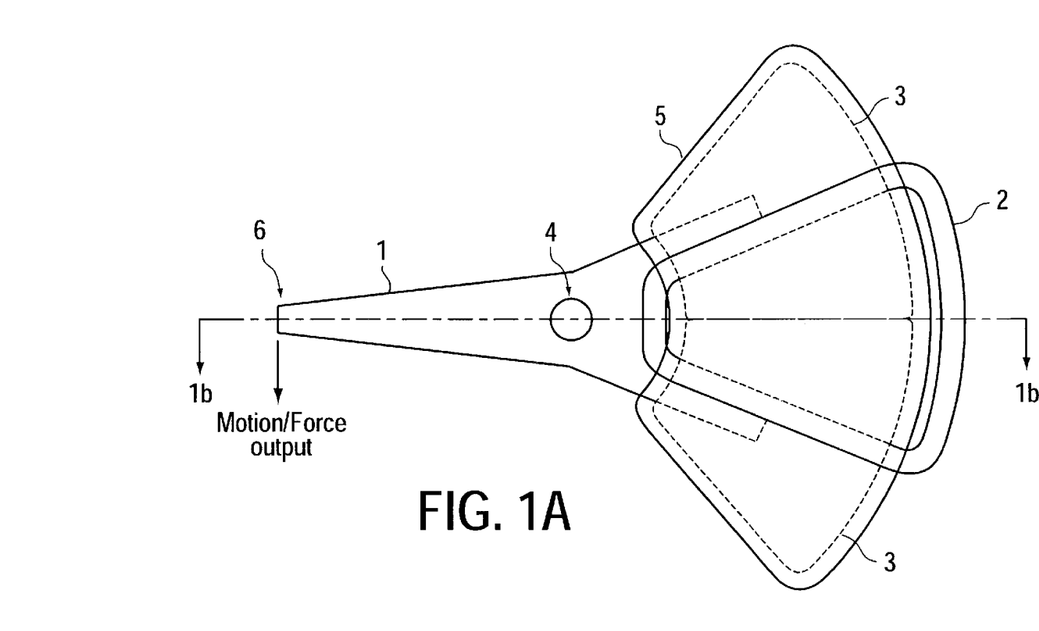
FIGS. 1a and 1b are top plan and side sectional views, respectively, of a prior art flat-coil actuator.

Flat-coil actuators are a particular type of actuator which consist of an electric coil (one or more adjacent loops of wire) which is placed in a small air-gap between pairs of opposing-pole permanent magnets such that when electric current is passed through the coil, a force is generated, thereby applying force to and causing motion in an attached linkage. The structure of a typical rotary flat-coil actuator is shown in FIG. 1a, which is a top plan view, and FIG. 1b, which is a side sectional view. Actuator linkage (rotor) 1 rotates about an axis of rotation 4 to provide motion and a rotary force output at one end 6 of the linkage 1. In a force feedback interface device, the end 6, for example, can be coupled to another linkage in a mechanism or directly to a manipulandum that is grasped by a user, such as a mouse, joystick handle, stylus, trackball, etc. The flat coil 2 is provided at the other end of the linkage 1. Stator magnets 3 surround the coil 2, where two magnets are positioned above the coil 2 and two magnets are positioned below the coil 2. Magnet backing irons 5 are coupled to the magnets, where one iron is positioned above the coil and one iron is positioned below the coil.

In comparison with many other types of electric actuators, flat-coil actuators are relatively low friction, low backlash (direct drive), low motion range, low force output, and high-speed. Flat-coil actuators are typically used in applications requiring high-precision, small motions. The most common use of flat-coil actuators is in computer hard disk drives: a rotary flat-coil actuator controls the position of the magnetic heads moving across the surface of the spinning disk drive platter(s). In haptic or force feedback mechanisms, flat-coil actuators can be used to drive one or more links in a variety of types of mechanisms and interface applications.

Current rotary flat-coil designs for haptic mechanisms based on pre-existing disk-drive flat-coil actuators, such as described in U.S. Pat. No. 5,642,469, have some significant limitations. One limitation is that the large footprint of the actuator precludes the use of multiple flat-coil actuators in close proximity. Multiple adjacent flat-coil actuators would allow more compact haptic mechanisms to be used. Another limitation is that position sensing in disk-drive flat-coil actuators is often performed using a dedicated read-only disk surface which contains factory-written positioning data to be read by the magnetic head for that surface. This approach is unfeasible for haptic mechanisms since no spinning disk surface is available. Some disk drive implementations have an alternate position sensing technique using an external optical encoder which is connected to the flat-coil actuator by either an extension of the linkage or by some sort of belt drive mechanism. However, this approach again increases the size of the flat-coil actuator footprint, which is an undesirable characteristic. Yet another limitation is that flat-coil actuators are inherently limited in performance by the amount of power they can dissipate as heat before the device fails (insulation burns or wire melts). Improvements in the heat dissipation characteristics of a flat-coil actuator would increase actuator performance.

SUMMARY OF THE INVENTION

The present invention describes a flat-coil actuator embedded in a linkage of a force feedback device, and which also includes an embedded sensor. This configuration allows more compact force feedback devices to be implemented.

More particularly, a flat-coil actuator of the present invention comprises a linkage operative to rotate about an axis. The linkage has two connection points, where one of the connection points is coupled to a ground. A flat coil is embedded in the linkage between the connection points. A plurality of magnets are positioned approximately parallel to the flat coil and grounded with respect to the linkage, where a force is produced on the linkage when a current is flowed in the flat coil. An embedded position sensor can be coupled to the linkage; for example, the sensor can include at least a portion of a code disk coupled to the linkage at the axis and an emitter/detector for detecting motion of the portion of said code disk. The linkage preferably surrounds the entire coil in a plane perpendicular to the axis. Furthermore, the flat coil preferably surrounds a non-conductive core that adds mechanical strength to the linkage.

A force feedback device incorporating the flat-coil actuator of the present invention includes a flat-coil actuator as described above, where a force is produced on the linkage when a current is flowed in the flat coil. A sensor such as an optical encoder is coupled to the linkage for detecting motion of the linkage about the axis. A user manipulandum graspable by a user is coupled to a connection point of the linkage such that the force is transmitted to the manipulandum. One of the connection points of the linkage is coupled to a ground, and the other of the connection points is coupled to the user manipulandum. In one embodiment, an intermediate linkage is coupled between the linkage and the user manipulandum. A five-bar linkage embodiment provides two flat-coil actuators and two intermediate linkages rotatably coupled to each other.

A method of the present invention for using an actuator to provide force feedback to a user of a force feedback device includes flowing a current through a planar coil of a flat-coil actuator included in the force feedback device, where the coil is positioned between first and second ends of a linkage. The linkage is rotated about an axis using the current and a magnetic field from at least one magnet positioned adjacent to the coil. The rotation outputs a force at the second end of the linkage, where the force is output to a user manipulandum coupled to the second end of the linkage. The rotation of the linkage is sensed with an encoder and a sensor signal is output. The sensor signal can be output to a host computer displaying a graphical environment, where images displayed in the graphical environment are updated based at least in part on the sensor signal, and where the host computer outputs a force feedback signal to the force feedback device so that the force output to the user manipulandum is based at least in part on the force feedback signal.

The apparatus of the present invention provides an integrated flat-coil actuator and mechanical linkage, which reduces the actuator size (footprint) and allows multiple versions of the flat-coil actuator to be mounted in close proximity. The embedded coil also increases the actuator heat dissipation, thereby allowing higher power output. The actuator further incorporates embedded position sensing capabilities at no significant increase in footprint size. One useful application of the inventions described herein is in the implementation of small or compact force feedback mechanisms, and is especially applicable to the low-cost mass market of force feedback devices.

These and other advantages of the present invention will become apparent to those skilled in the art upon a reading of the following specification of the invention and a study of the several figures of the drawing.

DETAILED DESCRIPTION OF PREFERRED EMBODIMENTS

Figure 2A:
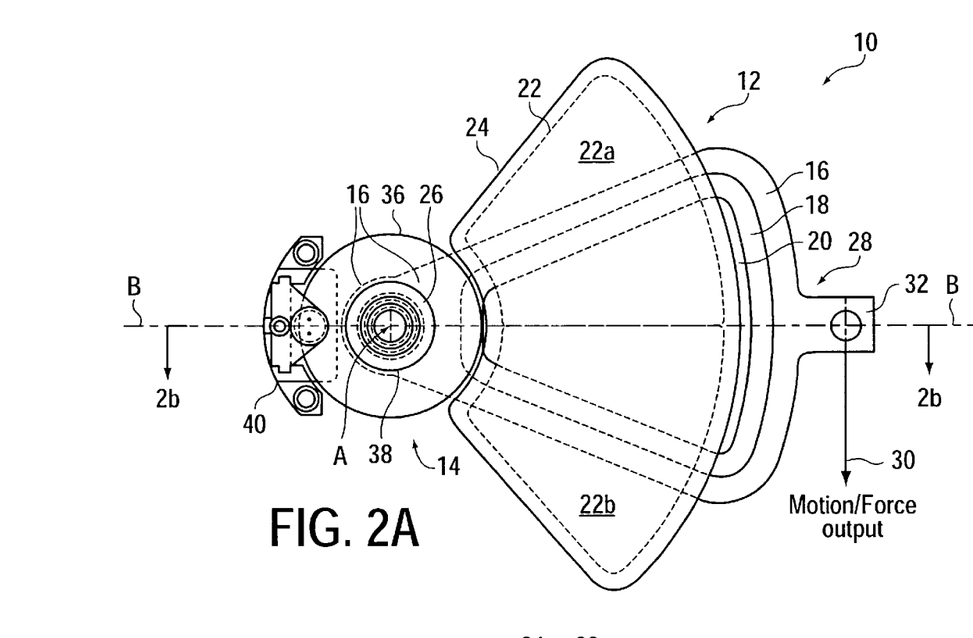
FIGS. 2a and 2b are top plan and side sectional views, respectively, of a flat-coil actuator and sensor of the present invention.
Figure 2B:
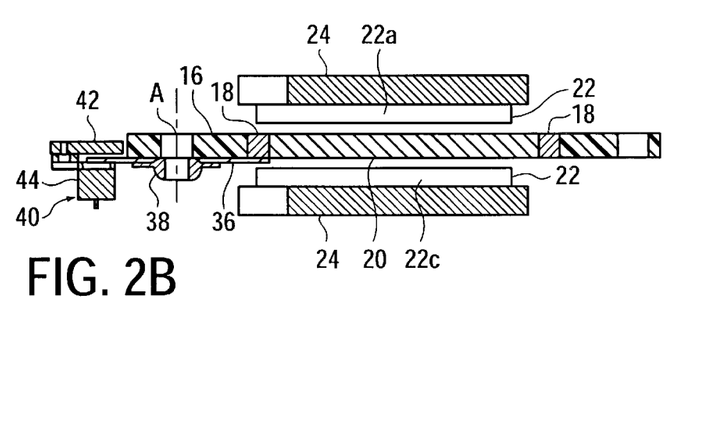

FIG. 2a is a top plan view and FIG. 2b is a side sectional view of a transducer 10 of the present invention. Transducer 10 includes a flat-coil actuator 12 and a sensor 14. Actuator 12 includes a linkage (rotor) 16, a flat coil 18, a coil core 20, stator magnets 22 and magnet backing irons 24. Linkage 16 is rotatably coupled to a grounded surface by a bearing 26 and may rotate about an axis A.

The flat coil 18 is embedded into the linkage 16 such that the coil is positioned between the two ends of the linkage 16, i.e. between the two connection points of the linkage, which are the grounded connection point at axis A and the floating connection point at a different point of the linkage (such as end 28). A portion of the linkage 16 surrounds the periphery of the flat coil 18 as shown, where an insulating material can be provided to insulate the linkage material from the coil in those embodiments in which the linkage is made of a conductive material. The coil 18 also surrounds a core 20 that adds mechanical strength to the actuator mechanism. The coil core 20 can be made of a nonconductive material, or alternatively, the core can be made of a conductive material, such as metal, with an insulting material provided between the core and the flat coil. The coil is shown wound about an approximately trapezoidal shape (in the top plan view), but may be wound about other shapes in other embodiments.

The stator magnets 22 include magnets 22a and 22b which abut each other and which are provided on one side of the coil 18; and magnets 22c and 22d which abut each other and are provided on the opposite side of the coil 18. The magnet backing irons 24 provide a flux path for the magnetic flux of the magnets 22, as is well known to those skilled in the art. A backing iron is provided for each pair of magnets 22a and 22b, and 22c and 22d. The backing irons 24 and magnets 22 are grounded with respect to the linkage 16. The magnets 22 and backing irons 24 are preferably approximately parallel to the plane of the coil 18, which is the plane perpendicular to the axis of rotation A.

The actuator operates by producing a force on the linkage 16 based on the electromagnetic interaction between a current flowed through the coil and the magnetic fields from magnets 22. The output of force in a flat coil actuator is well known to those skilled in the art, such in hard disk drives as described in U.S. Pat. No. 5,642,469, incorporated herein by reference. The linkage 16 is caused to rotate about axis A, thereby producing force in that degree of freedom.

One of the important advantages of the present invention is that the flat coil 18 is integrated in the mechanism linkage 16 between two ends or connection points of the linkage. Thus, the actuator 12 outputs force at the floating (coil) end 28 of the actuator, as shown by arrow 30, at a point on the linkage 16 on the same side of the axis of rotation A as the flat coil 18. Another linkage of a mechanism, or a manipulandum itself, can be coupled to one end or connection point such as connection member 32 at the end 28, so that the force output by the actuator is transmitted to the other linkage/manipulandum. The flat coil 18 is thus positioned between the connection points of the linkage 16, e.g. between the grounded connection point at axis A and the floating connection point at member 32.

Figure 1B:
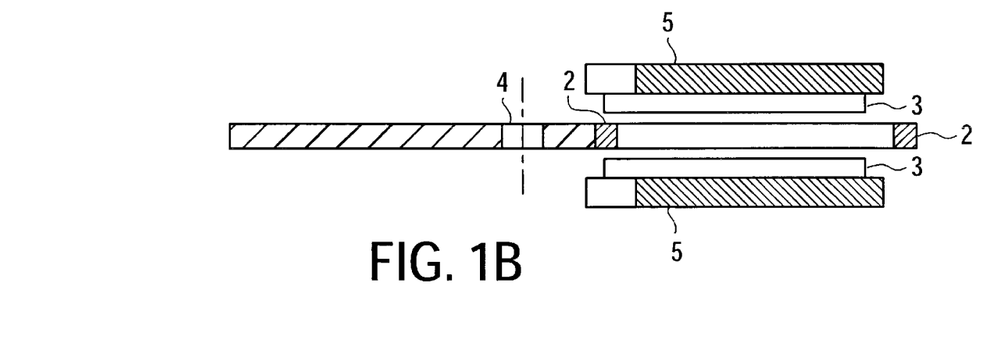

The coil embedded in the linkage and output of force at end 28 allows a more compact actuator design in comparison to the prior art actuators as shown in FIGS. 1a and 1b. This is because the linkage need not extend away from both sides of the axis of rotation A, thereby saving space on one side of the axis A. This approach reduces the amount of space needed behind the actuator, i.e. a reduced footprint is possible. Furthermore, a compact, embedded sensor may then be placed at the axis A without interference from the linkage 16. A preferred sensor is described in greater detail below.

As shown in FIG. 2a, the connection member 32 is preferably aligned with an axis B when the linkage 16 is also centered at the axis B, where the axis B intersects the axis of rotation A. The member 32 (or other connected linkage or member) can also be positioned at other locations on a floating end of the linkage 16 in other embodiments. A user manipulandum, such as a joystick, mouse, stylus, or other grasped object, can be coupled to the floating connection point of the linkage through another mechanism or directly. Examples of multi-member linkage mechanisms are shown with respect to FIGS. 3 and 4.

In addition, embedding the coil 18 into the linkage 16 increases the heat transfer from the coil to the link (in those embodiments in which the linkage is made of a material allowing it to act as a heatsink). This allows the actuator to be used at higher power levels without overheating. Finally, this mounting method gives added strength to the coil-rotor mechanical connection since the coil is completely surrounded by the linkage material in the plane of the coil.

In some embodiments, the rotary force output by actuator 12 can be output in a rotary degree of freedom of a user manipulandum. In other embodiments, the rotary output force can be converted to a linear force and output in a linear degree of freedom of the user manipulandum.

Sensor 14 is used to detect a position of the linkage 16, and is embedded in the actuator 12. This means that the sensor 14 reads motion of the actuator rotor. In a force feedback device, since motion of the rotor typically corresponds with motion of the user manipulandum, the sensor effectively reads the position of the manipulandum in a degree of freedom of the manipulandum.

In the preferred embodiment, sensor 14 is an optical encoder that includes a code disk 36, a code disk alignment hub 38, and an encoder emitter/detector 40. Code disk 36 is mounted directly on the rotor 16 and thus rotates with the rotor about axis A. Code disk alignment hub 38 can be used to align the center of the code disk 36 with the axis A by placing the hub on the shaft of the linkage 16 that rotatably connects the linkage 16 to a ground. Emitter/detector 40 is grounded with respect to the linkage 16 and code disk 36 and is positioned such that the code disk rotates between the emitter portion 42 and the detector portion 44 (emitter and detector positions can be reversed in alternate embodiments). The encoder detects motion of the code wheel and linkage 16 by detecting a beam emitted by emitter 42, where the beam is interrupted by portions of the code wheel as the wheel spins, such as spaces between open slots in the edge of the wheel. The operation of optical encoders is well known to those skilled in the art. Two detectors within detector portion 44 can be used to provide quadrature encoding, which allows both the magnitude and direction of motion of the code disk to be sensed. In other embodiments, other types of sensors can be used (Hall effect sensors, potentiometers, etc.).

The embedded sensor allows the transducer 10 to be of compact design since no separately-placed encoder is required to sense the position of the rotor 16 or the user manipulandum. The code disk 36 of the encoder is read by the emitter/detector 40 on the opposite side of the axis of rotation A from the flat coil 18. The emitter/detector is positioned close to the axis of rotation A to decrease the overall size of the transducer. Code disk 36 is shown as a circular disk; in other embodiments, only a portion of a circle (an arc) need be used, where the arc moves between the emitter and detector within the allowed movement range of the linkage. In other embodiments, the encoder can be positioned at other points on the linkage 16.

Figure 3:
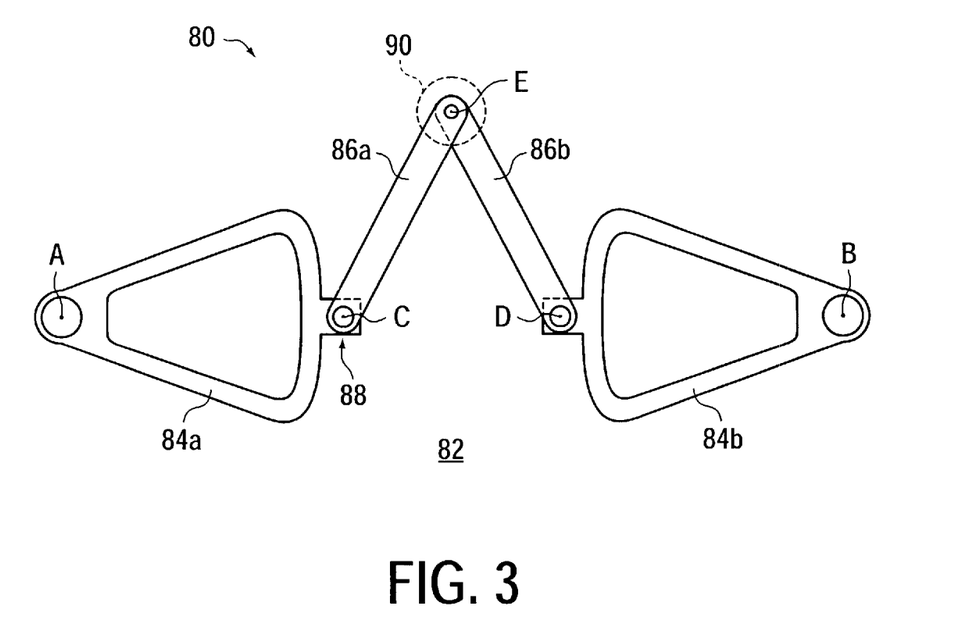
FIG. 3 is a top plan view of a first example embodiment of a mechanical interface using the flat-coil actuator of the present invention.

The increased compactness of this new rotary flat-coil actuator design allows multiple flat-coil actuators to be mounted within close proximity to each other, a desirable trait for haptic displays. FIG. 3 shows an example implementation of a mechanical interface 80 including two opposing rotary transducers of the present invention that include embedded flat coils and embedded position sensors. A ground surface 82, such as a base, supports a linkage 84a and a linkage 84b, which include a flat coil as according to the flat-coil actuator 12 of the present invention. Magnets (not shown) are also provided as described above with reference to FIGS. 2a and 2b. An optical encoder (not shown) is also preferably coupled to each of linkages 84 similar to the embodiment of FIG. 2. The linkages 84a and 84b are rotatably coupled to the ground surface 82 and thus may rotate about axes A and B, respectively. An intermediate linkage 86a is rotatably coupled to linkage 84a at the connection point 88a, and an intermediate linkage 86b is rotatably coupled to linkage 84b at the connection point 88b. The intermediate linkages 86a and 86b are rotatably coupled to each other at ends not coupled to the linkages 84a and 84b, respectively. The intermediate linkages 86a and 86b thus may be rotated about axes C and D, respectively, at the connection points 88 in a plane parallel to the plane of rotation of the linkages 84a and 84b about axes A and B. The connected ends of the intermediate linkages may similarly rotate with respect to each other about axis E. The mechanism 80 is thus a closed-loop 5-bar linkage mechanism, each of the linkages rotatably coupled to two other linkages, and where the flat-coil actuators are embedded in two of the five linkages. Preferably, a user manipulandum 90 is coupled at or near the axis E such that the manipulandum may be moved in two planar degrees of freedom. Such a user manipulandum can include a mouse, joystick, stylus, finger contact, sphere, or other object.

In other embodiments, the linkages 84a and 84b can be positioned in other orientations with respect to each other, e.g. the connection points of the linkages 84 at axes A and B can be positioned differently with respect to each other. Furthermore, the linkages of the mechanism can be of different lengths and have different link parameters. For example, linkage 86a can have a longer length than linkage 86b, and the end of linkage 86b can be rotatably coupled to linkage 86a at a point between the ends of linkage 86a (see FIG. 4). Other types of linkage mechanisms, such as open-loop mechanisms, can also be provided. Furthermore, in other embodiments of the present invention, more than two flat-coil actuators can be provided in a force feedback mechanism. For example, a manipulandum having three degrees of freedom can be provided with force feedback from a different flat-coil actuator of the present invention associated with each degree of freedom.

Figure 4:
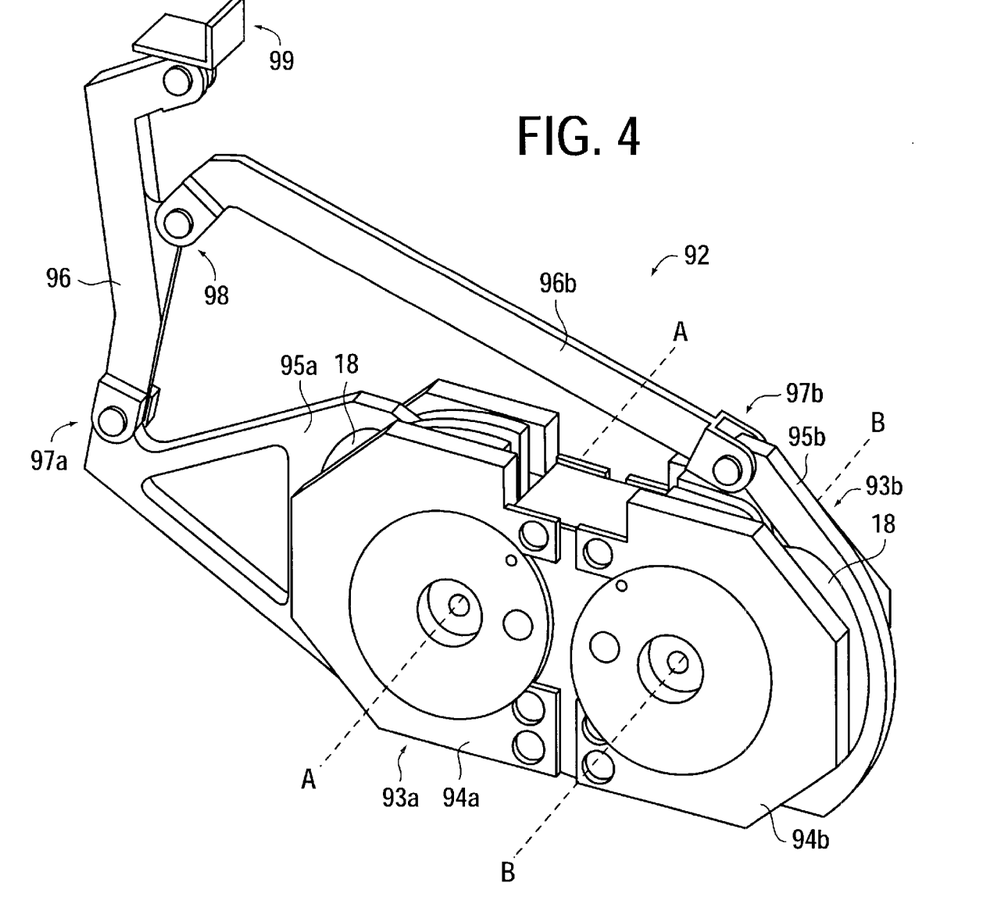
FIG. 4 is a perspective view of a second example embodiment of a mechanical interface using the flat-coil actuator of the present invention.

FIG. 4 is a perspective view of a different embodiment of a mechanical interface 92 that include two opposing rotary actuators of the present invention which are mounted in close proximity for a compact design. Similar to the mechanical interface 80 of FIG. 3, interface 92 includes two actuators 93a and 93b of the present invention. The grounded backing irons 94a and 94b of the two actuators can be coupled together as shown such that the axes of rotation A and B of the actuators are coupled to ground and positioned closer together rather than apart as shown in FIG. 3. Two linkages 95a and 95b include coils 18 embedded within them and rotate between magnets 22, and are rotatably coupled to linkages 96a and 96b, respectively, at the connection points 97a and 97b. As an example, the floating connection point 97b of linkage 95b is positioned differently with respect to the coil/linkage 95b than the floating connection point of linkage 95a with respect to coil/linkage 95a. The linkages 96a and 96b are rotatably coupled to each other at point 98, thus forming a closed-loop five bar linkage mechanism similar to the mechanism shown in FIG. 3; however, the linkages 95 and 96 have different lengths and configurations with respect to each other, i.e. are asymmetrical. Different linkage lengths, coupling points, and orientations can be provided in alternate embodiments. A user manipulandum 99 can be coupled to the linkage 96a (or linkage 96b in other embodiments), and can be a mouse, joystick, stylus, or other grasped object.

Figure 5:
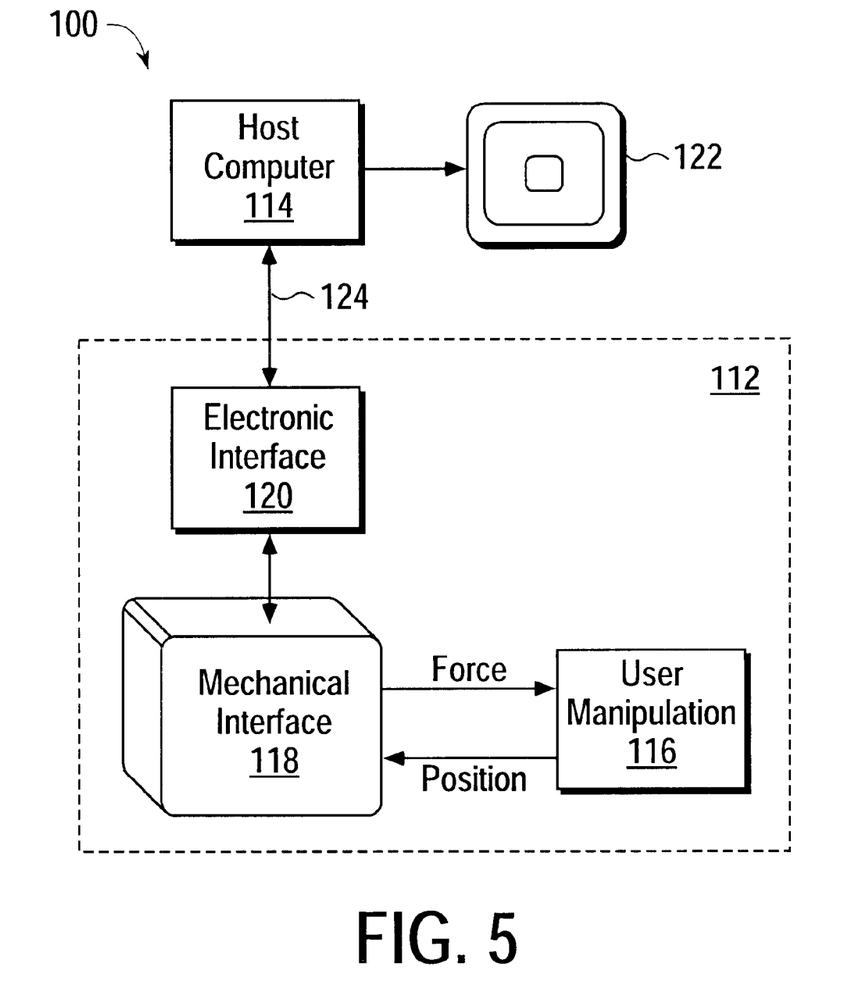
FIG. 5 is a block diagram of a system including a computer and force feedback interface device including the actuator of the present invention.

FIG. 5 is a block diagram illustrating an architecture of a system 100 incorporating a force feedback interface device that uses the flat-coil actuator design of the present invention. System 100 includes a force feedback interface device 112 and a host computer 114. Force feedback interface device 112 includes a user manipulandum 116, a mechanical interface 118, and an electronic interface 120.

User manipulandum 116 used in conjunction with the present invention is physically contacted (e.g. grasped) and manipulated by a user to provide input to the host computer 114 and to allow the user to experience force feedback output by the system. Images displayed on a display screen 122 of the computer system 114 can be updated in response to such manipulations. For example, a user can move a mouse 116 to correspondingly move a computer generated object, such as a cursor, in a graphical or virtual environment. It will be appreciated that a great number of types of objects can be used as manipulandums with the method and apparatus of the present invention. Such objects may include a mouse, joystick handle, stylus, grip, sphere, medical instrument, steering wheel, screw driver, etc.

Mechanical interface 118 interfaces mechanical input and output between the user manipulandum 116 and host computer 114 implementing the graphical environment. Mechanical interface 118 provides one or more degrees of freedom to manipulandum 116. The user manipulates manipulandum 116 in provided degrees of freedom and the position and/or orientation of the manipulandum is translated using mechanical interface 118 into a form suitable for interpretation by the sensors of the mechanical interface. The sensors track the movement of the manipulandum and provide suitable electronic signals to electronic interface 120. Electronic interface 120 provides position and/or orientation information to host computer 114. In addition, host computer 114 and/or electronic interface 120 provides force feedback signals or commands to the actuators included in mechanical interface 118, and the actuators generate forces on members of the mechanical apparatus to provide forces on manipulandum 116 in provided or desired degrees of freedom. The user experiences the forces generated on the manipulandum as realistic simulations of force sensations such as jolts, textures, vibrations, "barrier" forces, springs, dampers, and the like. For example, when a surface is generated on computer screen 122 and a computer object controlled by the user collides with the surface, the computer 114 can send force feedback signals to the electrical interface 120 and mechanical apparatus 118 to generate collision forces on the manipulandum 116.

The mechanical interface 118 includes the embedded flat-coil actuators as described with reference to FIGS. 2a and 2b. The linkages included in the mechanical interface which transmit forces to the manipulandum can take a variety of forms; some examples are shown above with respect to FIGS. 3 and 4.

Electronic interface 120 may couple the mechanical apparatus 118 to the host computer 114. Electronic interface 120 can be included within a housing of mechanical apparatus 118, in its own housing, or in host computer 114. More particularly, electronic interface 120 includes sensor and actuator interfaces that convert electrical signals to appropriate forms usable by mechanical apparatus 118 and host computer 114, such as amplifiers, digital-to-analog converters, etc. Interface 120 can also include a microprocessor local to the mechanical interface 118 and separate from any microprocessors in the host computer 114 to control local force feedback independently of the host computer. For example, the local microprocessor can read sensor signals, compute forces, and control the flat-coil actuators to output the computed forces independently of the host computer, as is well known to those skilled in the art.

The electronic interface 120 is coupled to the computer 114 by a bus 124 (or may be directly connected to the computer using a interface card). In other embodiments, signals can be sent to and from interface 120 and computer 114 by wireless transmission/reception. The interface 120 can serve as an input/output (I/O) device for the computer 114, and can receive inputs from other input devices or controls that are associated with mechanical interface 118 or manipulandum 116 and can relay those inputs to computer 114, such as button inputs from a button on manipulandum 116.

Host computer 114 is preferably a personal computer or workstation, such as a PC compatible computer or Macintosh personal computer, or a SUN or Silicon Graphics workstation. For example, the computer 114 can operate under the Windows™ or MSDOS operating system in conformance with an IBM PC AT standard. Alternatively, host computer system 114 can be one of a variety of home video game systems commonly connected to a television set, a "set top box", "Internet computer" or the like. Host computer 14 preferably includes a host microprocessor, random access memory (RAM), read only memory (ROM), input/output (I/O) circuitry, and other components of computers well-known to those skilled in the art.

Host computer 114 implements a host application program with which a user is interacting via mechanical interface apparatus 118 and other peripherals, if appropriate. For example, the host application program can be a video game, medical or other simulation, scientific analysis program, or other application program that utilizes input of manipulandum 116 and outputs force feedback to the manipulandum. The host application program checks for input signals received from electronic interface 120 and sensors of mechanical interface 118, and outputs force values and commands to be converted into forces on manipulandum 116.

Display device 122 is can be included in host computer 114 and can be a standard display screen or CRT, 3-D goggles, or any other visual interface. Typically, the host application program provides images to be displayed on display device 122 and/or other feedback, such as auditory signals.

While this invention has been described in terms of several preferred embodiments, there are alterations, modifications, and permutations thereof which fall within the scope of this invention. It should also be noted that the embodiments described above can be combined in various ways in a particular implementation. Furthermore, certain terminology has been used for the purposes of descriptive clarity, and not to limit the present invention. It is therefore intended that the following appended claims include such alterations, modifications, and permutations as fall within the true spirit and scope of the present invention.

What is claimed is:

1. A flat-coil actuator comprising:
 a linkage operative to rotate about an axis, said linkage having two connection points, wherein one of said connection points is coupled to a ground;
 a flat coil embedded in said linkage, said flat coil being positioned between said connection points; and
 a plurality of magnets positioned approximately parallel to said flat coil and grounded with respect to said linkage, wherein a first one or more magnets is positioned on a first side of said flat coil, and wherein a second one or more magnets is positioned on a second side of said flat coil such that said coil is oriented in a plane positioned between a plane of said first magnets and a plane of said second magnets, wherein a force is produced on said linkage when a current is flowed in said flat coil.

2. A flat-coil actuator as recited in claim 1 further comprising an embedded position sensor coupled to said linkage.

3. A flat-coil actuator as recited in claim 2 wherein said sensor includes at least a portion of a code disk coupled to said linkage at said axis and an emitter/detector for detecting motion of said portion of said code disk.

4. A flat-coil transducer as recited in claim 1 wherein said linkage is rotatably coupled to a ground at one of said connection points and to another linkage at the other of said connection points.

5. A flat-coil transducer as recited in claim 1 wherein said flat coil surrounds a core that adds mechanical strength to said linkage.

6. A flat-coil transducer as recited in claim 1 wherein each of said magnets is coupled to a backing iron.

7. A flat-coil transducer as recited in claim 1 wherein said linkage is coupled to a user manipulandum physically contacted by a user.

8. A force feedback interface device including an improved flat-coil actuator, the force feedback interface device comprising:
   a flat-coil actuator including:
      a linkage operative to rotate about an axis and having two connection points;
      a flat coil embedded in said linkage, said flat coil being positioned between said two connection points of said linkage; and
      a plurality of magnets positioned approximately parallel to said flat coil and grounded with respect to said linkage, wherein a force is produced on said linkage when a current is flowed in said flat coil;
   a sensor coupled to said linkage for detecting motion of said linkage about said axis; and
   a user manipulandum graspable by a user and coupled to one of said connection point of said linkage such that said force is transmitted to said user manipulandum.

9. A force feedback interface device as recited in claim 8 wherein one of said connection points of said linkage is coupled to a ground, and the other of said connection points is coupled to said user manipulandum.

10. A force feedback interface device as recited in claim 8 further comprising an intermediate linkage coupled between said linkage and said user manipulandum.

11. A force feedback interface device as recited in claim 10 wherein said flat-coil actuator is a first flat-coil actuator, and further comprising a second flat-coil actuator, wherein said user manipulandum is coupled to both said first and second flat-coil actuators.

12. A force feedback interface device as recited in claim 11 wherein said intermediate linkage is a first intermediate linkage, and further comprising a second intermediate linkage coupled between said second flat-coil actuator and said user manipulandum, wherein said first and second intermediate linkages are rotatably coupled to each other.

13. A force feedback interface device as recited in claim 12 wherein said flat-coil actuators and said intermediate linkages form a closed-loop five-bar linkage mechanism having linkages rotatably coupled to each other.

14. A force feedback interface device as recited in claim 8 wherein said flat coil is embedded in said end of said linkage such that a portion of said linkage entirely surrounds said coil in a plane perpendicular to said axis.

15. A force feedback interface device as recited in claim 8 wherein said sensor is an optical encoder including a code disk coupled to said linkage at said axis and a emitter/detector for detecting motion of said code disk.

16. A force feedback interface device as recited in claim 15 wherein said code disk is positioned between an emitter and a detector of said emitter/detector.

17. A method for using an actuator to provide force feedback to a user of a force feedback device, the method comprising:
   flowing a current through a planar coil of a flat-coil actuator included in said force feedback device, said coil positioned between first and second connection points of a member;
   rotating said member about an axis using said current and a magnetic field from at least one magnet positioned adjacent to said coil, wherein said rotation outputs a force at said second connection point of said member, wherein said force is output to a user manipulandum coupled to said second connection point of said member; and
   sensing said rotation of said member with an encoder and outputting a sensor signal representative of said rotation of said member.

18. A method as recited in claim 17 wherein said encoder includes a code disk coupled to said rotor at said axis and an emitter/detector for detecting motion of said code disk, wherein said code disk is positioned between an emitter and a detector of said emitter/detector.

19. A method as recited in claim 17 wherein said sensor signal is output to a host computer including a display screen, wherein images displayed on said display screen are updated at least in part based on said sensor signal.

20. A method as recited in claim 17 wherein said sensor signal is output to a host computer displaying a graphical environment, wherein images displayed in said graphical environment are updated based at least in part on said sensor signal, and wherein said host computer outputs a force feedback signal to said force feedback device, wherein said force output to said user manipulandum is based at least in part on said force feedback signal.

* * * * *